US010122740B1

(12) United States Patent
Finkelshtein et al.

(10) Patent No.: US 10,122,740 B1
(45) Date of Patent: Nov. 6, 2018

(54) METHODS FOR ESTABLISHING ANOMALY DETECTION CONFIGURATIONS AND IDENTIFYING ANOMALOUS NETWORK TRAFFIC AND DEVICES THEREOF

(71) Applicant: F5 Networks, Inc., Seattle, WA (US)

(72) Inventors: Peter Finkelshtein, Kiryat Yam (IL); Shlomo Yona, Kfar Yon (IL)

(73) Assignee: F5 Networks, Inc., Seattle, WA (US)

( * ) Notice: Subject to any disclaimer, the term of this patent is extended or adjusted under 35 U.S.C. 154(b) by 126 days.

(21) Appl. No.: 15/137,716

(22) Filed: Apr. 25, 2016

Related U.S. Application Data

(60) Provisional application No. 62/156,968, filed on May 5, 2015.

(51) Int. Cl.
*G06F 21/55* (2013.01)
*H04L 29/06* (2006.01)

(52) U.S. Cl.
CPC ...... *H04L 63/1425* (2013.01); *H04L 63/1441* (2013.01)

(58) Field of Classification Search
CPC ................................ H04L 63/14; G06F 21/55
See application file for complete search history.

(56) References Cited

U.S. PATENT DOCUMENTS 6,748,056 B1 6/2004 Capriotti et al.
7,228,412 B2 6/2007 Freed
7,519,834 B1 4/2009 Dondeti et al.
9,077,709 B1 7/2015 Dall
9,578,055 B1 2/2017 Khanal
9,628,499 B1 * 4/2017 Yu ...................... H04L 63/1416
9,654,485 B1 5/2017 Neumann
2002/0116615 A1 8/2002 Nguyen et al.
2004/0103283 A1 5/2004 Hornak
2005/0027846 A1 2/2005 Wolfe et al.
2008/0263215 A1 10/2008 Schnellbaecher
2010/0325418 A1 12/2010 Kanekar
(Continued)

OTHER PUBLICATIONS

F5 Networks, Inc., "F5 TMOS Operation Guide", Manual, Mar. 5, 2015, pp. 1-297.
(Continued)

*Primary Examiner* — Izunna Okeke
(74) *Attorney, Agent, or Firm* — LeClairRyan PLLC

(57) ABSTRACT

A method, non-transitory computer readable medium, and network security apparatus that monitors received network traffic to obtain signal data for signals associated with the network traffic in accordance with a stored configuration. A model and configuration update(s) are generated and the stored configuration is updated based on the configuration update(s). The model includes a threshold for at least one of the signals. A determination is made when there is an anomaly in the network traffic based on the application of the model to the signal data or a match of at least a portion of the signal data to an anomalous traffic pattern received from a centralized analytic server computing device. A mitigation action is initiated, when the determining indicates that there is an anomaly in the network traffic. Accordingly, this technology facilitates dynamic and adaptive network traffic analysis and anomaly detection including improvements thereto independent of human intervention.

20 Claims, 7 Drawing Sheets

| | Traffic Management Computing Device ("TMCD") | Direction | Analytic Server Computing Device ("Analytic Server") |
|---|---|---|---|
| 700 | Default logic for signal data collection and Anomaly Detection model is loaded. Generates statistics and initial data on received traffic. | | |
| 702 | Signals the Analytic Server that it is up and running with default version of the logic | → | |
| 704 | | ← | Sends updated logic, if available back to TMCD, which instructs what to collect, how to collect, how to perform the anomaly detection and against what model. |
| 706 | Signal data from the TMCD are collected periodically (e.g., every 1 second) and for each such snapshot | | |
| 708 | Snapshot is compared to model to detect anomalies | | |
| 710 | Snapshot with signal data and anomaly detection results are queued to be sent to the Analytic Server | → | |
| 712 | | | Analytic Server evaluates efficiency and effectiveness of what is being collected on the TMCD. results, impact and contribution and as a result may: |
| 714 | | | Update anomaly detection model |
| 716 | | | Update configuration for TMCD to change its logic of what to collect, how to collect, or how to use the Anomaly Detection Model |
| 718 | | ← | Analytic Server sends back to TMCD updated model and updated configuration |
| 720 | TMCD applies new configuration | | |
| 722 | Repeat steps 704-720 | | |

(56) References Cited

U.S. PATENT DOCUMENTS

| | | | |
|---|---|---|---|
| 2011/0154026 | A1 | 6/2011 | Edstrom |
| 2011/0264905 | A1 | 10/2011 | Ovsiannikov |
| 2012/0323700 | A1 | 12/2012 | Aleksandrovich et al. |
| 2014/0095865 | A1 | 4/2014 | Yerra |
| 2014/0298419 | A1 | 10/2014 | Boubez |
| 2015/0067328 | A1 | 3/2015 | Yin |
| 2015/0271179 | A1 | 9/2015 | Wang et al. |

OTHER PUBLICATIONS

BIG-IP® Analytics: Implementations, version 11.3, Nov. 15, 2012, F5 Networks, Inc., pp. 1-40.

F5 Networks, "BIG-IP Local Traffic Manager: Concepts", version 11.4, pp. 1-178, retrieved from https://support.f5.com/kb/en-us/products/big-ip_ltm/manuals/product/ltm-concepts-11-4-0.html on Feb. 12, 2015.

F5 Networks, "BIG-IP Local Traffic Manager. Implementations", version 11.4, pp. 1-234, retrieved from https://support.f5.com/kb/en-us/products/big-ip_ltm/manuals/product/ltm-implementations-11-4-0.html on Feb. 12, 2015.

F5 Networks, "BIG-IP Local Traffic Manager: Monitors Reference", version 11.4, pp. 1-106, retrieved from https://support.f5.com/kb/en-us/products/big-ip_ltm/manuals/product/ltm-monitors-reference-11-4-0.html on Feb. 12, 2015.

F5 Networks, "Operations Guide 1.0 F5 Local Traffic Manager and Global Traffic Managaer", pp. 1.144, retrieved from https://support.f5.com/kb/en-us/products/big-ip_ltm/manuals/product/f5-ltm-gtm-operations-guide-1-0.html on Feb. 12, 2015.

F5 Networks, "Release Note: BIG-IP LTM and TMOS", version 11.4.1, pp. 1-58, retrieved from https://support.f5.com/kb/en-us/products/big-ip_ltm/releasenotes/product/relnote-ltm-11-4-1.html on Feb. 12, 2015.

F5 Networks, Inc., "BIG-IP Application Security Manager Operations Guide", Manual, Feb. 5, 2016, pp. 1-181, F5 Networks, Inc.

F5 Networks, Inc., "BIG-IP ASM 11.5.0", Release Notes, Apr. 12, 2016, Version 11.5.0.

F5 Networks, Inc., "BIG-IP ASM", Release Notes, Jun. 13, 2016, pp. 1-18, version 11.6.1 F5 Networks, Inc.

F5 Networks, Inc., "BIG-IP® Analytics: Implementations", Manual, Jan. 31, 2014, pp. 1-50, Version 11.5.

F5 Networks, Inc., "BIG-IP® Analytics: Implementations", Manual, Aug. 25, 2014, pp. 1-62, v11.6, F5 Networks, Inc.

F5 Networks, Inc., "BIG-IP® Application Security Manager™: Getting Started", Manual, Aug. 25, 2014, pp. 1-78, version 11.6, F5 Networks, Inc.

F5 Networks, Inc., "BIG-IP® Application Security Manager™: Implementations", Manual, Aug. 25, 2014, pp. 1-420, version 11.6, F5 Networks, Inc.

F5 Networks, Inc., "BIG-IP® Application Security Manager™: Implementations", Manual, Jan. 31, 2014, pp. 1-396, Version 11.5.

F5 Networks, Inc., "BIG-IP® Application Security Manager™: Implementations", F5 Networks, Inc., Dec. 10, 2014, version 11.6, pp. 1-420.

F5 Networks, Inc., "BIG-IP® Local Traffic Management: Basics", Manual, Aug. 25, 2014, pp. 1-74, version 11.6, F5 Networks, Inc.

F5 Networks, Inc., "BIG-IP® Network Firewall: Policies and Implementations", Manual, Aug. 10, 2016, pp. 1-166, v11.6, F5 Networks, Inc.

F5 Networks, Inc., "BIG-IP® Systems: DoS Protection and Protocol Firewall Implementations", Manual, Aug. 25, 2014, pp. 1-108, v11.6, F5 Networks, Inc.

F5 Networks, Inc., "BIG-IP® TMOS®: Concepts", Manual, Nov. 11, 2014, pp. 1-148, Version 11.5.

F5 Networks, Inc., "BIG-IP® TMOS®: Implementations", Manual, Jan. 31, 2014, pp. 1-274, Version 11.5.

F5 Networks, Inc., "F5 BIG-IP TMOS: Operations Guide", Manual, Mar. 5, 2015, pp. 1-276 version 11.6, F5 Networks, Inc.

* cited by examiner

| | Traffic Management Computing Device ("TMCD") | Direction | Analytic Server Computing Device ("Analytic Server") |
|---|---|---|---|
| 700 | Default logic for signal data collection and Anomaly Detection model is loaded. Generates statistics and initial data on received traffic. | | |
| 702 | Signals the Analytic Server that it is up and running with default version of the logic | → | |
| 704 | | ← | Sends updated logic, if available back to TMCD, which instructs what to collect, how to collect, how to perform the anomaly detection and against what model. |
| 706 | Signal data from the TMCD are collected periodically (e.g., every 1 second) and for each such snapshot | | |
| 708 | Snapshot is compared to model to detect anomalies | | |
| 710 | Snapshot with signal data and anomaly detection results are queued to be sent to the Analytic Server | → | |
| 712 | | | Analytic Server evaluates efficiency and effectiveness of what is being collected on the TMCD, results, impact and contribution and as a result may: |
| 714 | | | Update anomaly detection model |
| 716 | | | Update configuration for TMCD to change its logic of what to collect, how to collect, or how to use the Anomaly Detection Model |
| 718 | | ← | Analytic Server sends back to TMCD updated model and updated configuration |
| 720 | TMCD applies new configuration | | |
| 722 | Repeat steps 704-720 | | |

FIG. 7

METHODS FOR ESTABLISHING ANOMALY DETECTION CONFIGURATIONS AND IDENTIFYING ANOMALOUS NETWORK TRAFFIC AND DEVICES THEREOF

This application claims the benefit of U.S. Provisional Patent Application Ser. No. 62/156,968, filed on May 5, 2015, which is hereby incorporated by reference in its entirety.

FIELD

This technology generally relates to computer network security and, more particular, to methods and devices for establishing anomaly detection configurations and identifying anomalous network traffic.

BACKGROUND

Many networks storing data, such as web applications, web pages, or other content, include traffic management computing devices that, among other functions, protect the server devices storing the data from malicious attacks. One such attack is a distributed denial of service (DDoS) attack, although many other malicious attacks exist. The malicious attacks can be identified based on anomalous network traffic received by the traffic management computing devices.

Currently, traffic management computing devices identify anomalous network traffic based on a set of thresholds corresponding to various signals in the network traffic. However, the thresholds, as well as which signals are monitored, are established by administrators and are relatively static. Accordingly, the thresholds have limited effectiveness, particularly for networks in which characteristics of the observed traffic change over time.

Moreover, malicious attacks often target many different storage networks that have traffic management computing devices. If a malicious attack is thwarted by one traffic management device, then the attacker may move on to target another storage network. However, traffic management computing devices currently operate in relative isolation and are not aware of other attacks that have been observed by other traffic management computing devices in other networks. Accordingly, traffic management computing devices are unable to prepare for, or defend against, network attacks in an early and effective manner.

SUMMARY

A method for identifying anomalous network traffic includes monitoring, by a network security apparatus, received network traffic to obtain signal data for signals associated with the network traffic in accordance with a stored configuration. A model and configuration update(s) are generated, by the network security apparatus, and the stored configuration is updated based on the configuration update(s). The model includes a threshold for at least one of the signals. A determination is made, by the network security apparatus, when there is an anomaly in the network traffic based on the application of the model to the signal data or a match of at least a portion of the signal data to an anomalous traffic pattern received from a centralized analytic server computing device. A mitigation action is initiated, by the network security apparatus, when the determining indicates that there is an anomaly in the network traffic.

An application security management apparatus includes memory comprising programmed instructions stored in the memory and one or more processors configured to be capable of executing the programmed instructions stored in the memory to monitor received network traffic to obtain signal data for signals associated with the network traffic in accordance with a stored configuration. A model and configuration update(s) are generated and the stored configuration is updated based on the configuration update(s). The model includes a threshold for at least one of the signals. A determination is made when there is an anomaly in the network traffic based on the application of the model to the signal data or a match of at least a portion of the signal data to an anomalous traffic pattern received from a centralized analytic server computing device. A mitigation action is initiated, when the determining indicates that there is an anomaly in the network traffic.

A non-transitory computer readable medium having stored thereon instructions for identifying anomalous network traffic includes executable code which when executed by one or more processors, causes the one or more processors to perform steps including monitoring received network traffic to obtain signal data for signals associated with the network traffic in accordance with a stored configuration. A model and configuration update(s) are generated and the stored configuration is updated based on the configuration update(s). The model includes a threshold for at least one of the signals. A determination is made when there is an anomaly in the network traffic based on the application of the model to the signal data or a match of at least a portion of the signal data to an anomalous traffic pattern received from a centralized analytic server computing device. A mitigation action is initiated, when the determining indicates that there is an anomaly in the network traffic.

This technology has a number of associated advantages including providing methods, non-transitory computer readable media, and network security apparatuses that improve network security by monitoring signals associated with network traffic and dynamically updating configurations and models used to identify potential network attacks without human intervention. With this technology, network traffic anomalies can be more effectively detected facilitating earlier mitigation actions to protect servers from malicious attacks. Additionally, anomalous traffic patterns can be shared with this technology across storage networks so that corresponding attacks can identified earlier and more effectively thwarted.

BRIEF DESCRIPTION OF THE DRAWINGS

FIG. 7 is a flowchart of an exemplary method for establishing, by an exemplary analytic server computing device, anomaly detection configurations for an exemplary traffic management computing device.

DETAILED DESCRIPTION

Figure 1:
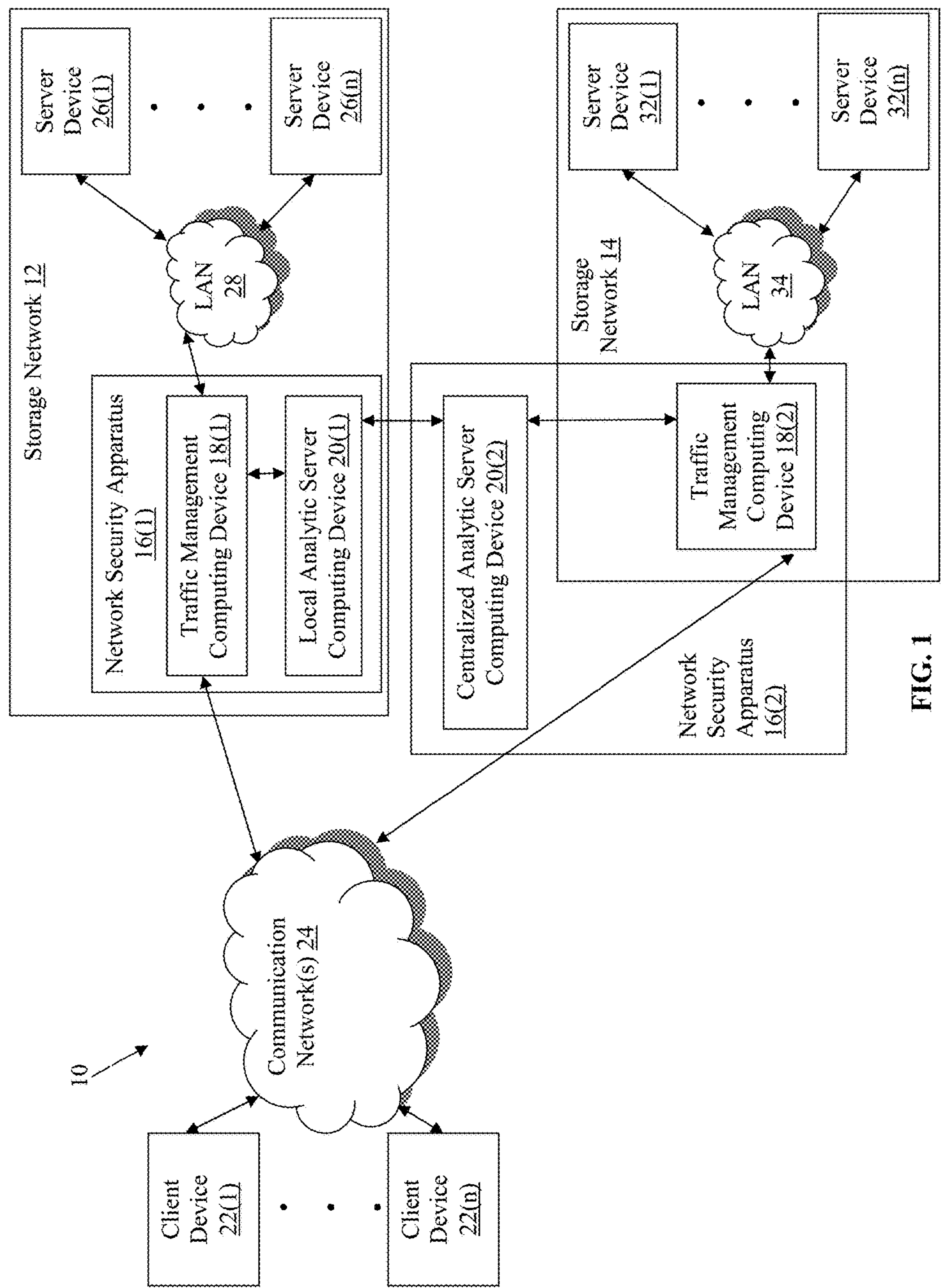
FIG. 1 is a block diagram of a network environment with an exemplary network security apparatus with a traffic management computing device and local analytic server computing device.

Referring to FIG. 1, a system diagram of an exemplary network environment 10 including exemplary storage networks 12 and 14 is illustrated. The storage network 12 in this particular example includes a network security apparatus 16 having a traffic management computing device 18(1) and a local analytic server computing device 20(1). The traffic management computing device 18 is coupled to client device 22(1)-22(*n*) via communication network(s) 24 and server devices 26(1)-26(*n*) via a local area network (LAN) 28. The storage network 14 includes a traffic management computing device 30 coupled to the client devices 22(1)-22(*n*) via the communication network(s) 24 and server devices 32(1)-32(*n*) via LAN 34. The network environment 10 also includes a centralized analytic server computing device 20(2) coupled to the local analytic server computing device 20 and the traffic management computing device 18(2) and may include other network devices, such as one or more routers and/or switches, for example, which are well known in the art and thus will not be described herein. This technology provides a number of advantages including methods, non-transitory computer readable media, and network security apparatuses that dynamically establish anomaly detection configurations and more effectively identify anomalous network traffic.

Figure 2:
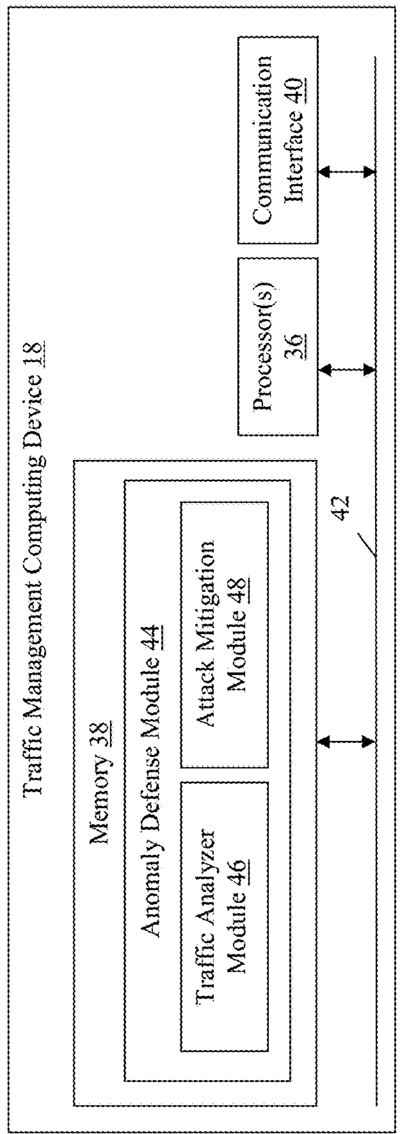
FIG. 2 is a block diagram of an exemplary traffic management computing device.

Referring to FIGS. 1-2, each of the traffic management computing devices 18(1) and 18(2) performs network traffic analysis and anomaly detection as well as the collection and logging/transmission of signal data (raw and target) to one of the analytic server computing devices 20(1) and 20(2). Additionally, the traffic management computing devices 18(1) and 18(2) may perform any number of functions in addition to identifying anomalous network traffic directed toward the server devices including accelerating and optimizing network traffic communicated between the server devices and client devices in order to improve the user experience.

The traffic management computing devices 18(1) and 18(2) can also perform other functions on the network traffic, such as load balancing the network traffic to the server devices and/or implementing firewalls or other security measures on behalf of web applications executing on the server devices, for example. The exemplary traffic management computing device 18 in this particular example includes one or more processor(s) 36, a memory 38, and a communication interface 40, which are coupled together by a bus 42 or other communication link, although one or more of the traffic management computing devices 18(1) and 18(2) may include other types and numbers of elements in other configurations.

The processor(s) 36 of the traffic management computing device 18 may execute programmed instructions stored in the memory 38 for any number of the functions identified above and/or described herein for identifying anomalous network traffic and, optionally, managing network traffic and/or optimizing service of content requests, for example. The processor(s) 36 of the traffic management computing device 18 may include one or more central processing units and/or general purpose processors with one or more processing cores, for example, although other types of processor(s) can also be used.

The memory 38 of the traffic management computing device 18 stores these programmed instructions for one or more aspects of the present technology as described and illustrated herein, although some or all of the programmed instructions could be stored and executed elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 36, can be used for the memory 38.

Figure 4:
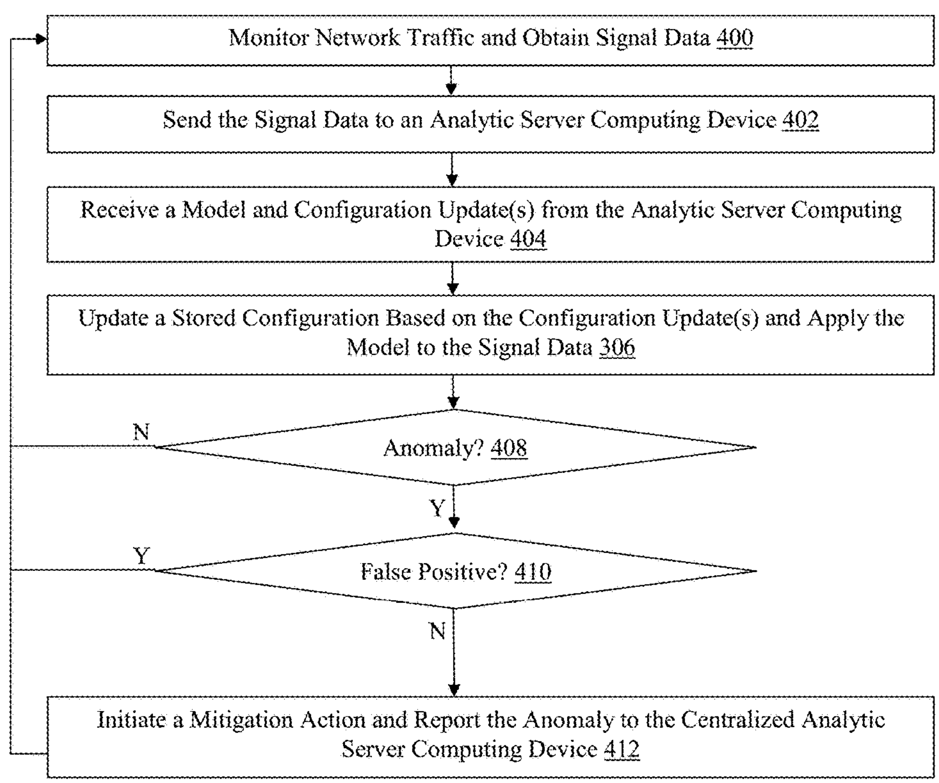
FIG. 4 is a flowchart of an exemplary method for identifying, by an exemplary traffic management computing device, anomalous network traffic.

Accordingly, the memory 38 of the traffic management computing device 18 can store one or more applications that can include computer executable instructions that, when executed by the traffic management computing device 18, cause the traffic management computing device 18 to perform actions, such as to transmit, receive, or otherwise process messages, for example, and to perform other actions described and illustrated below with reference to FIGS. 4-6. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the traffic management computing device 18 itself, may be located in virtual server(s) running in a cloud-based computing environment rather than being tied to one or more specific physical network computing devices. Also, the application(s) may be running in one or more virtual machines (VMs) executing on the traffic management computing device 18. Additionally, in one or more embodiments of this technology, virtual machine(s) running on the traffic management computing device 18 may be managed or supervised by a hypervisor.

In this particular example, the memory 38 of the traffic management computing device 18 includes an anomaly defense module 44 that includes a traffic analyzer module 46 and an attack mitigation module 48, although other modules may be included in the memory 38 or in the anomaly defense module 44 in other examples. The anomaly defense module 44 generally defends against malicious attacks corresponding to observed anomalous network traffic.

In particular, the traffic analyzer module 46 of the anomaly defense module 44 obtains signal data regarding observed network traffic based on stored configurations and applies models to the signal data to determine whether an anomaly exists in the network traffic, as described and illustrated in more detail later. The attack mitigation module 48 of the anomaly defense module 44 in this example executes mitigation actions when the traffic analyzer module 46 determines an anomaly exists in the network traffic, also as described and illustrated in more detail later.

The communication interface 40 of the traffic management computing device 18 operatively couples and communicates between the traffic management computing device 18, client devices 22(1)-22(*n*), server devices 26(1)-26(*n*) and 32(1)-32(*n*), and analytic server computing devices 20(1) and 20(2). In particular, the traffic management computing devices 18(1) and 18(2) are coupled to the client devices 22(1)-22(*n*) by the communication network(s) 24, although other types and numbers of communication networks or systems with other types and numbers of connections and configurations to other devices and elements. can also be used By way of example only, the communication network(s) and LAN can use TCP/IP over Ethernet and industry-standard protocols, including NFS, CIFS, SOAP, XML, LDAP, and SNMP, although other types and numbers of communication networks, can be used.

Figure 3:
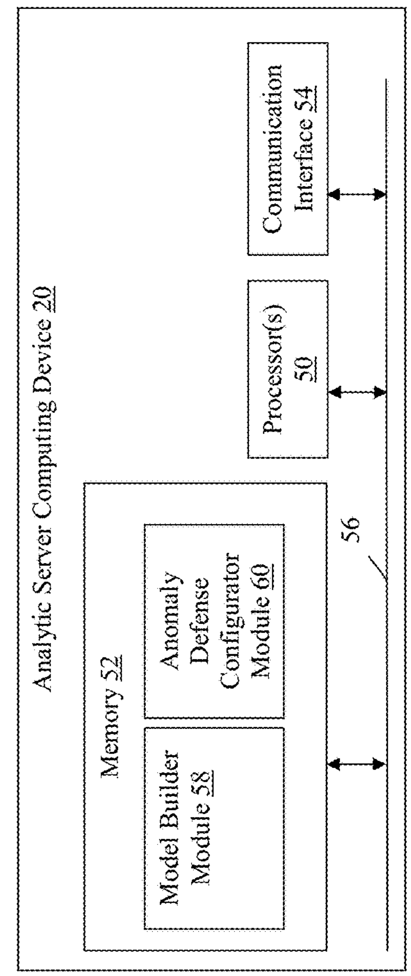
FIG. 3 is a block diagram of an exemplary analytic server computing device.

Referring to FIGS. 1-3, the local and/or centralized analytic server computing devices 20(1) and 20(2) are each configured to process signal data received from one of the traffic management computing devices 18(1) and 18(2) and to generate models and configuration updates that facilitate subsequent network traffic analysis by the traffic management computing devices 18(1) and 18(2). The local analytic server computing device 20(1) is illustrated in this particular example as a separate device that allows significant processing related to model generation and machine learning to be performed separate from the traffic management computing device 18(1).

In another example, the centralized analytic server computing device 20(2) is located outside of the storage network 14 that includes the associated traffic management computing device 18(2), such as in a cloud network, for example. In this example, the centralized analytic server computing device 20(2) can perform the functions of the local analytic server computing device 20(1) (e.g., as described and illustrated in more detail later with reference to FIG. 7). In yet other examples, the functionality provided by the analytic server computing devices 20(1) and 20(2) can be performed by analytic modules included in the memory 38 of the traffic management computing device 18, and other configurations can also be used. Additionally, in examples in which the analytic server computing device 20 is acting a centralized analytic server computing device 20(2), the analytic server computing device 20 information regarding one or more detected anomalies and publish the traffic pattern associated with the anomalies, as described and illustrated in more detail later with reference to FIG. 8.

In this particular example, an exemplary analytic server computing device 20 includes one or more processor(s) 50, a memory 52, and a communication interface 54, which are coupled together by a bus 56 or other communication link, although the analytic server computing device 20 may include other types and numbers of elements in other configurations.

The processor(s) 50 of the analytic server computing device 20 may execute programmed instructions for any number of the functions identified above and/or described herein for establishing anomaly detection configurations and associated updates and generating models that facilitate the identification of anomalous network traffic by the traffic management computing devices 18(1) and 18(2). The processor(s) 50 of the analytic server computing device 20 may include one or more central processing units and/or general purpose processors with one or more processing cores, for example.

The memory 52 of the analytic server computing device 20 stores these programmed instructions for one or more aspects of the present technology as described and illustrated herein, although some or all of the programmed instructions could be stored and executed elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 50, can be used for the memory 52.

Accordingly, the memory 52 of the analytic server computing device 20 can store one or more applications that can include computer executable instructions that, when executed by the analytic server computing device 20, cause the analytic server computing device 20 to perform actions, such as to transmit, receive, or otherwise process messages, for example, and to perform other actions described and illustrated below with reference to FIGS. 7-8. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the analytic server computing device 20 itself, may be located in virtual server(s) running in a cloud-based computing environment rather than being tied to one or more specific physical network computing devices. Also, the application(s) may be running in one or more virtual machines (VMs) executing on the analytic server computing device 20. Additionally, in one or more embodiments of this technology, virtual machine(s) running on the analytic server computing device 20 may be managed or supervised by a hypervisor.

In this particular example, the memory 52 of the analytic server computing device 20 includes a model builder module 58 and an anomaly defense configurator module 60, although other modules can also be used in other examples. The model builder module 58 in this example is configured to dynamically generate models that can be applied by one or more of the traffic management computing devices 18(1)-18(*n*) to identify anomalous network traffic. The models can include thresholds for any number of signals that together represent a traffic pattern and that, when one or more are exceeded, indicate that an anomaly exists in the observed network traffic, as described and illustrated in more detail later.

The anomaly defense configurator module 60 generates configurations and configuration updates that can be used by one or more of the traffic management computing devices 18(1) and 18(2) to obtain signal data associated with observed network traffic. Accordingly, the configuration updates can effectively result in reprogramming the traffic analyzer module 46 of one or more of the traffic management computing devices 18(1) and 18(2) dynamically and without user intervention. The configurations can be generated dynamically and can specify which signals to monitor and the parameters of the monitoring (e.g., frequency, duration, or subset of the network traffic), for example, among other configurations also as described and illustrated in more detail later.

The communication interface 54 of the analytic server computing device 20 operatively couples and communicates with the traffic management computing devices 18(1) via a direct connection or LAN (not shown) and the centralized analytic server computing device via a direct connection, in the case of the local analytic server computing device 20(1). In the case of the centralized analytic server computing device 20(2), the communication interface 54 operatively couples and communicates with the local analytic server computing device 20(1) and the traffic management computing device 18(2) via direct connection(s) or LAN(s) (not shown). Other types and numbers of communication networks or systems with other types and numbers of connections and configurations to other devices and elements can also be used. The LANs 28 and 34 and/or communication network(s) 24 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

Each of the server devices 26(1)-26(*n*) and 32(1)-32(*n*) in this example includes one or more processors, a memory, and a communication interface, which are coupled together by a bus or other communication link, although other numbers and types of network devices could be used. The server devices 26(1)-26(*n*) and 32(1)-32(*n*) in this example process requests received from the client devices via the communication network(s) according to the HTTP-based application RFC protocol, for example. Various applications may be operating on the server devices 26(1)-26(*n*) and 32(1)-32(*n*) and transmitting data (e.g., files or Web pages) to the client devices 22(1)-22(*n*) via the traffic management computing devices 18(1) and 18(2) in response to requests from the client devices 22(1)-22(*n*). The server devices 26(1)-26(*n*) and 32(1)-32(*n*) may be hardware or software or may represent a system with multiple servers in a pool, which may include internal or external networks.

Although the server devices 26(1)-26(*n*) and 32(1)-32(*n*) are illustrated as single devices, one or more actions of each of the server devices 26(1)-26(*n*) and 32(1)-32(*n*) may be distributed across one or more distinct network computing devices that together comprise one or more of the server devices 26(1)-26(*n*) and 32(1)-32(*n*). Moreover, the server devices 26(1)-26(*n*) and 32(1)-32(*n*) are not limited to a particular configuration. Thus, the server devices 26(1)-26(*n*) and 32(1)-32(*n*) may contain a plurality of network computing devices that operate using a master/slave approach, whereby one of the network computing devices of the server devices 26(1)-26(*n*) and 32(1)-32(*n*) operate to manage and/or otherwise coordinate operations of the other network computing devices. The server devices 26(1)-26(*n*) and 32(1)-32(*n*) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 26(1)-26(*n*) and 32(1)-32(*n*) can operate within one or more of the traffic management computing devices 18(1) and 18(2) themselves, rather than as a stand-alone server device. In this example, the one or more of the server devices 26(1)-26(*n*) and 32(1)-32(*n*) operate within the memory 38 of one or more of the traffic management computing devices 18(1) and 18(2).

The client devices 22(1)-22(*n*) in this example include any type of computing device that can generate, receive, and process network traffic, such as mobile computing devices, desktop computing devices, laptop computing devices, tablet computing devices, virtual machines (including cloud-based computers), or the like. Each of the client devices 22(1)-22(*n*) in this example includes a processor, a memory, and a communication interface, which are coupled together by a bus or other communication link, although other numbers and types of network devices could be used.

The client devices 22(1)-22(*n*) may run interface applications, such as standard web browsers or standalone client applications, that may provide an interface to make requests for, and receive content stored on, one or more of the server devices 26(1)-26(*n*) and 32(1)-32(*n*) via the communication network(s) 24 and 20. The client devices 22(1)-22(*n*) may further include a display device, such as a display screen or touchscreen, and/or an input device, such as a keyboard for example.

Although the exemplary network environment with the traffic management computing devices 18(1) and 18(2), client devices 22(1)-22(*n*), server devices 26(1)-26(*n*) and 32(1)-32(*n*), local analytic server computing device 20(1), centralized analytic server computing device 20(2), LANs 28 and 34, and communication network(s) 24 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network, such as the traffic management computing devices 18(1) and 18(2), client devices 22(1)-22(*n*), server devices 26(1)-26(*n*) and 32(1)-32(*n*), local analytic server computing device 20(1), centralized analytic server computing device 20(2), for example, may be configured to operate as virtual instances on the same physical machine. In other words, one or more of the traffic management computing devices 18(1) and 18(2), client devices 22(1)-22(*n*), server devices 26(1)-26(*n*) and 32(1)-32(*n*), local analytic server computing device 20(1), centralized analytic server computing device 20(2) may operate on the same physical device rather than as separate devices communicating through communication network(s). Additionally, there may be more or fewer traffic management computing devices, client devices, server devices, local analytic server computing devices, or centralized analytic server computing devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein, as described herein, which when executed by a processor, cause the processor to carry out the steps necessary to implement the methods of the examples, as described and illustrated herein.

Exemplary methods for establishing anomaly detection configurations and identifying anomalous network traffic will now be described with reference to FIGS. 1-8. Referring more specifically to FIG. 4, a method for identifying anomalous network traffic, by one of the traffic management computing devices 18(1) and 18(2) of one of the network security apparatus 16(1) and 16(2), is illustrated. In this particular example, the traffic management computing device 18 includes either of the traffic management computing devices 18(1) and 18(2) and the analytic server computing device 20 includes either of the local analytic server computing device 20(1) or the centralized analytic server computing device 20(2) unless otherwise specified.

In step 400 in this example, the traffic management computing device 18 monitors network traffic and obtains data regarding signals associated with the network traffic in accordance with a stored, default configuration. The monitoring of the network traffic can be performed by the traffic analyzer module 46 stored in the memory 38 of the traffic management computing device 18, for example. The signals can relate to any characteristics of received network traffic (e.g., HTTP requests for content stored by the server devices **26(1)-26(*n*) and 32(1)-32(*n*)**).

Accordingly, the signals can include HTTP methods (e.g., GET and POST), web browser type or user agent value, device type (e.g., bots, desktop, or mobile), number or value of HTTP headers, the existence of HTTP headers, or HTTP request content type, for example, although any other signals relating to observed network traffic originating with the client devices **22(1)-22(*n*) can also be used. The signals can be defined by a stored configuration initially established by an administrator and subsequently modified over time by the analytic server computing device 20 that is in communication with the traffic management computing device 18**, as described and illustrated in more detail later.

In step 402 in this example, the traffic management computing device 18 sends the signal data to the analytic server computing device 20. The signal data can be collected and/or sent periodically (e.g., every second) in the form of snapshots or collected continuously and sent automatically as it is obtained, for example. While the traffic management computing device 18 is sending the signal data, it is concurrently obtaining additional signal data and processing the associated network traffic. Accordingly, the steps 400 and 402 can be performed in parallel in this example.

In step 404, the traffic management computing device 18 receives a model and configuration update(s), if generated by the analytic server computing device 20 in the current iteration, as described and illustrated in more detail later. The model in this example includes a threshold for at least one of the signals and can be based on at least one anomalous traffic pattern corresponding to at least a subset of the signals.

The anomalous traffic pattern can be observed in another of the storage networks 12 or 14, and sent to the analytic server computing device 20, as described and illustrated in more detail later. In some examples the model includes a threshold for each of a plurality of signals that is learned over time by the analytic server computing device 20. Accordingly, the model facilitates the identification of an anomaly in the network traffic currently being observed by the one of the traffic management computing devices, also as described and illustrated in more detail later.

The configuration updates in this example include indications of signals for which signal data should no longer be obtained by the traffic management computing device 18 or additional signals for which signal data should subsequently be obtained by the traffic management computing device 18. In other examples, the configurations can define the volume of signal data to be obtained and sent, the interval for sending the signal data, certain types of traffic having specified characteristics that should or should not be monitoring, how to collect the signal data, how to perform anomaly detection and against what model, or any other type of configurations relating to the monitoring of network traffic by the one of the traffic management computing devices. Accordingly the analytic server computing device 20 effectively reprograms the traffic management computing device 18 and determines, on behalf of the traffic management computing device 18, the characteristics of the network traffic that should be monitored in order to aid the identification of anomalies.

In step 406, the traffic management computing device 18 updates the stored configuration to reflect any configuration updates received from the analytic server computing device 20 in the current iteration and applies the model to at least a portion of the signal data obtained in step 400 or otherwise currently being monitored. In order to apply the model, the traffic management computing device 18 can compare the thresholds included in the model to the signal data or a pattern corresponding to the signal data to the anomalous traffic pattern(s) included in the model. Other methods of applying the model can also be used in other examples.

In step 408, the traffic management computing device 18 determines whether an anomaly has been observed in the network traffic corresponding to the signal data based on the application of the model to the signal data. Accordingly, the traffic management computing device 18 can determine whether one or more of the thresholds are exceeded or the degree of the match between the pattern corresponding to the signal data and the anomalous traffic pattern(s) included in the model based on the comparison performed in step 406.

If an established number of thresholds, or thresholds corresponding to an established subset of specific one(s) of the signals, are exceeded, or if the pattern matches one of the anomalous traffic pattern(s) to an established degree of confidence, then the traffic management computing device 18 may determine an anomaly exists in the network traffic. Optionally, the result obtained from the comparison in step 408 can be correlated with other indicators, such as server latency or other traffic volume metrics that may also be indicative of an anomaly. Accordingly, if the traffic management computing device 18 determines an anomaly exists, then the Yes branch is taken to step 410.

In step 410, the traffic management computing device 18 determines whether the anomaly is a false positive. In order to determine whether the anomaly is a false positive, in one example, the network traffic management computing device 18 determines whether a ratio of a plurality of types of signal data for one of the signals corresponds to another ratio of the types of signal data for the one of the signals previously obtained during a prior monitoring of at least one other set of received network traffic.

Figure 5:
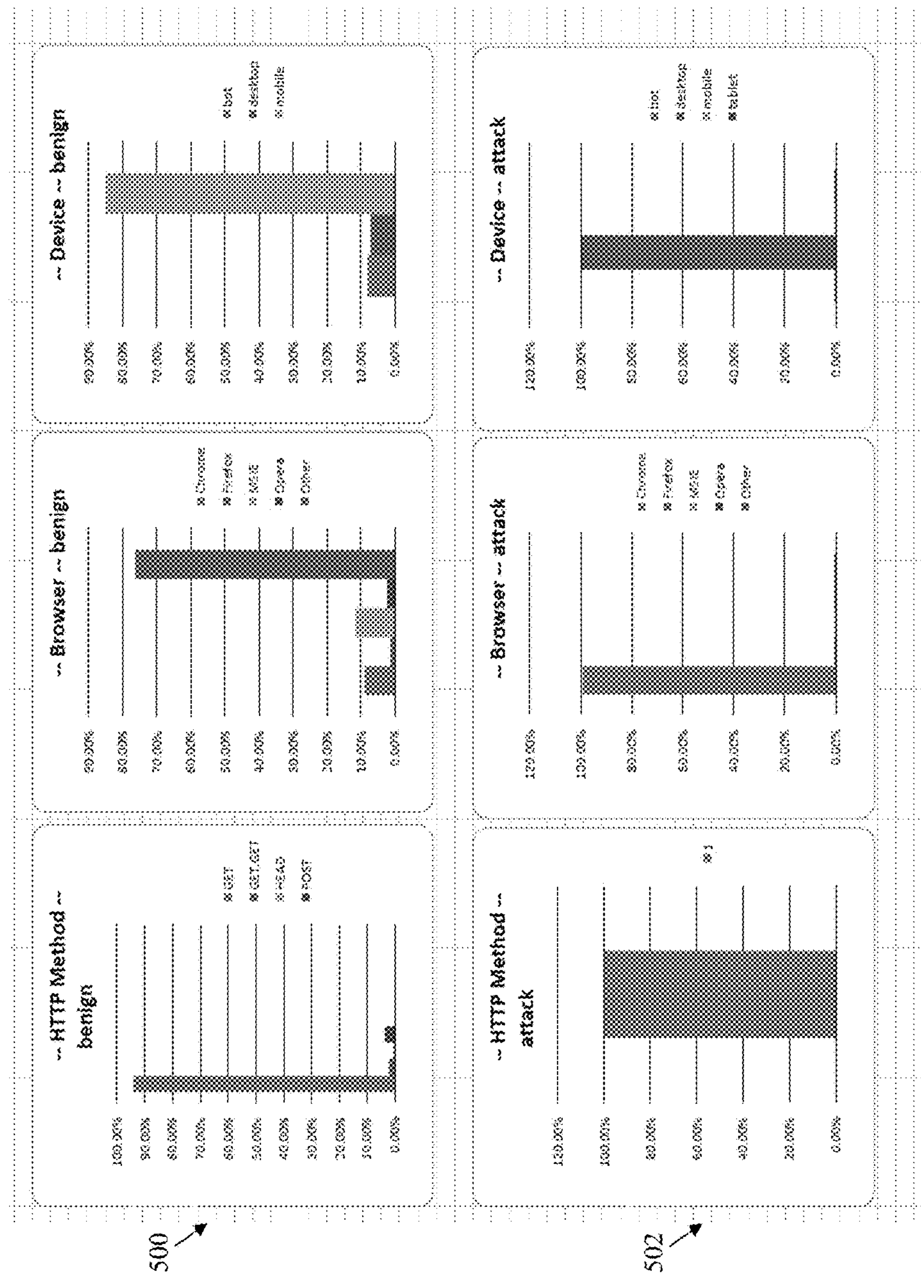
FIG. 5 is a sets of graphs representing observed signal data for HTTP method, browser type, and device type signals.

Referring more specifically to FIG. 5, a first set of graphs 500 and a second set of graphs 502 representing observed signal data for HTTP method, browser type, and device type signals is illustrated. In this example, the first set of graphs 500 illustrates the ratios of different types of signal data for each of the three signals obtained during one or more time periods in which an anomaly was not being experienced. Accordingly, the ratios represent signal data obtained from benign network traffic. While signal data in a current iteration may indicate significant volume increases crossing a threshold in the model for one or more of the signals, if the traffic management computing device 18 determines that the ratios of the types of signal data (e.g., number of HTTP GET, HEAD, and POST methods for the HTTP methods signal) is not significantly different than that indicated in the model, then the increased network traffic volume may not represent an attack that required mitigation.

Alternatively, and referring to the second set of graphs 502, if the ratio of the types of signal data for one or more signals does vary significantly from that indicated in the model, then the traffic management computing device 18 may determine that an attack is occurring irrespective of the network traffic volume. Other methods of determining whether an anomaly is a false positive can also be used in other examples. Referring back to FIG. 4, if the traffic management computing device 18 determines that the anomaly is not a false positive, then the No branch is taken to step 412.

In step 412, the traffic management computing device 18 initiates a mitigation action. The mitigation action can be initiated by the attack mitigation module 48, for example, and can include blocking network traffic having certain characteristics, intentionally dropping packets from certain of the client devices, presenting certain client devices with challenges before proceeding to accept network traffic in order to confirm whether the client devices are malicious bots, or any other type of mitigation action intended to defend the server computing devices 26(1)-26(*n*) and 32(1)-32(*n*). In examples in which the analytic server computing device 20 is the local analytics server computing device 20(1), the local analytic server computing device 20(1) also optionally reports the anomaly to the centralized analytic server computing device 20(2) to facilitate distribution of the associated anomalous traffic pattern, as described and illustrated in more detail later.

The traffic management computing device 18 also reports the anomaly to the analytic server computing device 20 as confirmation that the model did correlate with an anomaly so that the model can be used in a subsequent learning process performed by the analytic server computing device 20. As part of reporting the anomaly, the traffic management computing device 18 can include information specifically regarding the anomaly, such as the matching anomalous traffic pattern or the signals for which the associated threshold was exceeded triggering the determination of the anomaly. Subsequent to initiating the mitigation action and reporting the anomaly, or if the traffic management computing device 18 determines that an anomaly has not been detected and the No branch is taken from step 408 or that the anomaly is a false positive and the Yes branch is taken from step 410, the traffic management computing device 18 proceeds back to step 400 and continues to monitor network traffic, as described and illustrated in more detail earlier.

Figure 6:
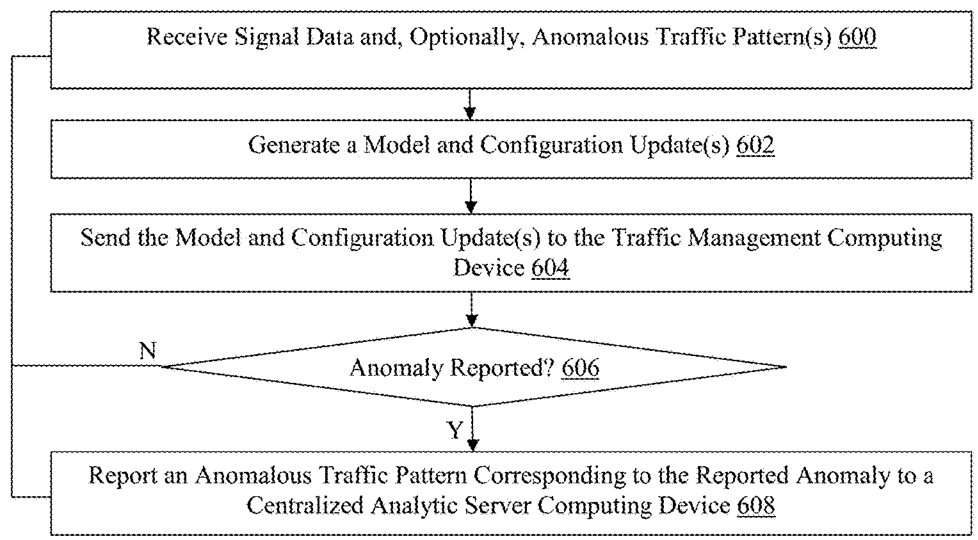
FIG. 6 is a timing diagram of an exemplary method for establishing anomaly detection configurations and identifying anomalous network traffic.

Referring more specifically to FIG. 6, a method for establishing anomaly detection configurations is illustrated. In this particular example, the analytic server computing device 20 is the local analytic server computing device 20(1) and the traffic management computing device 18 is the traffic management computing device 18(1), unless otherwise indicated. In step 600 in this example, the analytic server computing device 20 receives signal data from the traffic management computing device 18 and, optionally, at least one anomalous traffic pattern from the centralized analytic server computing device 20(2). The signal data can be sent from the traffic management computing device 18 as described and illustrated earlier with reference to step 402 of FIG. 4.

The anomalous traffic pattern can be published by the centralized analytic server computing device 20(2) and can be observed by traffic management computing device 18(2) or another analytic server computing device in storage network 14 (not shown) or another storage network, for example. In this example, the analytic server computing device 20 can subscribe to the centralized analytic server computing device 20(2) by sending a subscription request with identifying address information for the analytic server computing device 20. While illustrated in this example as occurring in the same step, the signal data can be received continuously or periodically and the anomalous traffic pattern(s) can be received at any time and when published by the centralized analytic server computing device 20(2).

In step 602, the analytic server computing device 20 generates a model and one or more configuration updates. The model or configuration updates can be sent periodically or at other specified times and do not have to be sent concurrently. The model can be generated based on initial baseline threshold values for one or more signals, thresholds learned over time based on historical observations of signal data, or anomalous traffic patterns received from the centralized analytic server computing device 20(2), for example, although other inputs can be used in order to generate the model.

Accordingly, models can be generated dynamically based on historical information regarding what signals or signal data are more or less indicative of a malicious anomaly in view of the specific characteristics of network traffic observed in the storage network 12. For example, in some storage networks HTTP traffic may have been observed to include a relatively high number of HTTP headers. Accordingly, increased HTTP traffic with a high number of HTTP headers may not be indicative of an anomaly in these storage networks, although such traffic may be considered anomalous in other storage networks. Therefore, in these storage networks, the associated threshold for the number of HTTP headers signal may be set relatively high in the generated model.

In another example, the analytic server computing device 20 may learn over time that the HTTP request content type is not a meaningful signal likely to indicate anomalous network traffic irrespective of the associated signal data. Accordingly, the analytic server computing device 20 may generate a configuration update in order to change the configuration stored by the anomaly defense configurator module 60 of the traffic management computing device 18 to discontinue obtaining data for the HTTP request content type signal as part of the monitoring performed by the traffic management computing device 18, as described and illustrated in more detail with reference to step 400 in FIG. 4.

The generated configuration updates can be in the form of an executable program or replacement source code or any other type of program code that can be used by the traffic management computing device 18 to modify the monitoring of network traffic performed by the traffic analyzer module 46 of the traffic management computing device 18. Other signals or associated thresholds, other types or number of models, or other types or number of configuration updates can also be used in other examples.

In step 604 in this example, the one of the analytic server computing devices sends the model and configuration update(s) to the one of the traffic management computing devices. Steps 602 and 604 are optional and not necessarily performed during each iteration. The model and configuration update(s) can be received by the traffic management computing device as described and illustrated earlier with reference to step 404 in FIG. 4, for example.

In an step 606 in this example, the analytic server computing device 20 determines whether an anomaly has been reported by the traffic management computing device 18, such as described and illustrated earlier with reference to step 410 of FIG. 4, for example. If the analytic server computing device 20 determines an anomaly has been reported, then the Yes branch is taken to step 608.

In step 608 in this example, the analytic server computing device 20 optionally reports an anomalous traffic pattern corresponding to the anomaly to the centralized analytic server computing device 20(2). In some examples, the analytic server computing device 20 does not report the anomalous traffic pattern if it was previously published to the analytic server computing device 20 by the centralized analytic server computing device 20(2), since the centralized analytic server computing device 20(2) would already be aware of the pattern. Accordingly, the analytic server computing device 20 can organize the signal data included in the anomaly report from the traffic management computing device 18 into a traffic pattern and send the anomalous traffic pattern to the centralized analytic server computing device 20(2) in step 608 in this example.

Subsequent to reporting the anomalous traffic pattern, or if the analytic server computing device 20 determines in step 606 that an anomaly was not reported and the No branch is taken, the analytic server computing device 20 proceeds back to step 600 and continues receiving signal data from the traffic management computing device 18, as described and illustrated earlier. Optionally, the analytic server computing device 20 can disregard signal data for a specific period of time subsequent to an anomaly being reported so that the learning process uses only signal data associated with network traffic communicated during normal operating conditions when the traffic management computing device 18 is not under attack.

Referring more specifically to FIG. 7, a timing diagram of a method for establishing anomaly detection configurations and identifying anomalous network traffic is illustrated. In this particular example, the traffic management computing device 18 includes either of the traffic management computing devices 18(1) and 18(2) and the analytic server computing device 20 includes either of the local analytic server computing device 20(1) or the centralized analytic server computing device 20(2) unless otherwise specified.

In step 700 in this example, the traffic management computing device 18 executes default logic for signal data collection and loads a default anomaly detection model. Additionally, the traffic management computing device 18 begins receiving network traffic and generating statistics and initial signal data based on the received network traffic.

In step 702, the traffic management computing device 18 signals the analytic server computing device 20 that it is up and running. The signal can be in the form of a message sent over a network with a unique indication of the traffic management computing device 18 that can be used by the analytic server computing device 20 to identify subsequent information (e.g. signal data and anomaly detection results) received from the traffic management computing device 18, for example. In this particular example, steps 700 and 702 can be performed substantially in parallel.

In step 704, the analytic server computing device 20 sends updated logic (e.g., including configuration updates and an updated model) to the traffic management computing device 18. The updated logic in this example includes instructions regarding what signal data to collect, how to collect the signal data, how to perform the anomaly detection, and against what model the signal data should be compared.

In step 706, the traffic management computing device 18 periodically (e.g., every second) obtains signal data and generates a snapshot based on the signal data. In step 708, the traffic management computing device 18 compares the collected signal data to the model received in step 704 in order to detect an anomaly. In step 708, the traffic management computing device 18 incorporates the result of the model comparison into the snapshot and queues, and eventually sends, the snapshot with the signal data and anomaly detection result to the analytic server computing device 20.

In step 710, the analytic server computing device 20 evaluates the efficiency and effectiveness of the signal data collected by the traffic management computing device 18, including the impact on, or contribution to, the anomaly detection result. Based on the evaluation, the analytic server computing device 20 can update the anomaly detection model in step 714 and/or generate configuration updates in step 716.

In step 718, the analytic server computing device 20 sends the updated model and configurations generated in steps 714 and 716, respectively, if any, to the traffic management computing device 18. In step 720, the traffic management computing device 18 applies the configuration updates associated with the new configuration. Thereafter, steps 704 though 720 are repeated using the updated model and signal data obtained using the new configuration.

Figure 8:
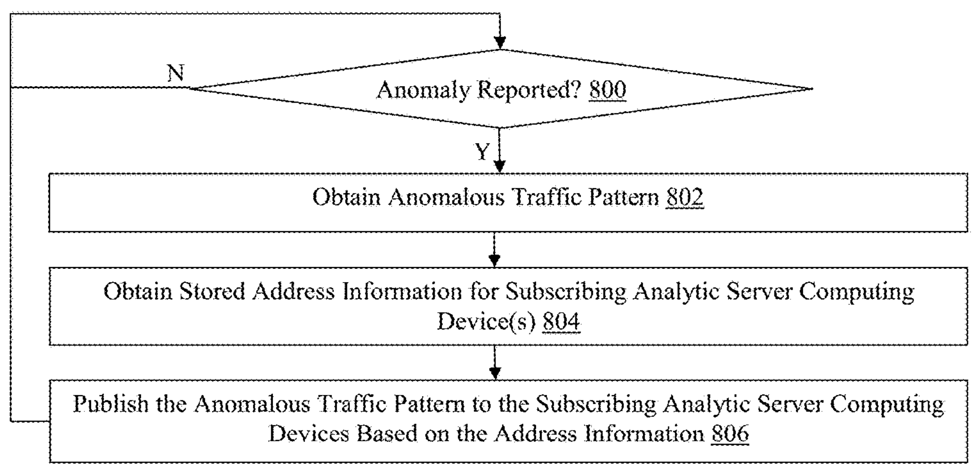
FIG. 8 is a flowchart of an exemplary method for facilitating, by an exemplary centralized analytic server computing device, the establishment of anomaly detection configurations and identification of anomalous network traffic

Referring more specifically to FIG. 8, a method for facilitating the establishment of anomaly detection configurations and identification of anomalous network traffic is illustrated. In this particular example, the analytic server computing device 20 is the centralized analytic server computing device 20(2) and the traffic management computing device 18 is the traffic management computing device 18(2), unless otherwise indicated.

In step 800, the analytic server computing device 20 determines whether an anomaly has been reported by the local analytic server computing device 20(1) or the traffic management computing device 18, such as described and illustrated earlier with reference to step 608 of FIG. 6. If the analytic server computing device 20 determines that an anomaly has not been reported, then the No branch is taken and the analytic server computing device 20 effectively waits to receive a reported anomaly.

However, if the analytic server computing device 20 determines an anomaly has been reported, then the Yes branch is taken to step 802. In step 802, the analytic server computing device 20 obtains an anomalous traffic pattern from, and as observed by, the local analytic server computing device 20(1) or the traffic management computing device 18.

In step 804, the analytic server computing device 20 obtains address information for subscribing analytic server computing device(s) and/or traffic management computing device(s) present in various other storage networks. The address information could have been previously obtained and stored in response to subscriber requests sent as described and illustrated earlier with reference to the step 600 of FIG. 6, for example, although other methods of facilitating subscriptions to the analytic server computing device 20 can also be used.

In step 806, the analytic server computing device 20 publishes the anomalous traffic pattern corresponding to the obtained address information. Subsequent to publishing the anomalous traffic pattern, the analytic server computing device 20 proceeds back to step 800 and determines whether another anomaly has been reported, as described and illustrated in more detail earlier.

Accordingly, with this technology, traffic management computing devices can be dynamically configured to detect anomalies based on historical signal data relating to received network traffic. Thereby, traffic management computing device can more effectively detect anomalies over time and can better defend server devices against malicious attacks. Additionally, analytic server computing devices present in many storage networks can advantageously be made aware of anomalous traffic patterns observed in other storage networks, and thereby defend associated server devices from the corresponding anomalous traffic earlier and more effectively.

Having thus described the basic concept of the disclosed technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the disclosed technology. Additionally, the recited order of processing elements or sequences, or the use of numbers, letters, or other designations therefore, is not intended to limit the claimed processes to any order except as may be specified in the claims. Accordingly, the disclosed technology is limited only by the following claims and equivalents thereto.

What is claimed is:

1. A method for handling network attacks implemented by a network traffic management system comprising one or more network security apparatuses, client devices, server devices, or analytic server devices, the method comprising:

monitoring network traffic between clients and servers for signal data according to a stored security configuration that instructs a traffic management application on which particular types of signal data to identify, the stored security configuration and an associated anomaly model being obtained from one or more analytic servers;

determining when there is an anomaly in the network traffic based on at least one of:

application of the anomaly model to the signal data; or matching of at least a portion of the signal data to an anomalous traffic pattern received from the one or more analytic servers; and initiating a mitigation action when the determining indicates that there is an anomaly in the network traffic based on a current ratio of signal data types in the network traffic to a historical ratio of signal data types, wherein the traffic manager application utilizes one or more configuration updates obtained from the one or more analytic servers to update the stored security configuration for redefining which particular types of signal data to monitor.

2. The method of claim 1, further comprising, when the determining indicates that there is an anomaly in the network traffic based on the application of the anomaly model to the signal data:

generating another anomalous traffic pattern based on the anomaly; and reporting the another anomalous traffic pattern to a centralized analytic server device, wherein the anomalous traffic pattern comprises signal data for two or more signals.

3. The method of claim 1, wherein the model is generated by a local analytic server of a network security apparatus, the local analytic server is in communication with a centralized analytic server, and the determination of when there is an anomaly in the network traffic is made by a traffic manager of the network security apparatus.

4. A non-transitory computer readable medium having stored thereon instructions for handling network attacks comprising executable code which when executed by one or more processors, causes the one or more processors to:

monitor network traffic between clients and servers for signal data according to a stored security configuration that instructs a traffic management application on which particular types of signal data to identify, the stored security configuration and an associated anomaly model being obtained from one or more analytic servers;

determine when there is an anomaly in the network traffic based on at least one of:

application of the anomaly model to the signal data; or matching of at least a portion of the signal data to an anomalous traffic pattern received from the one or more analytic servers; and initiate a mitigation action when the determining indicates that there is an anomaly in the network traffic based on a current ratio of signal data types in the network traffic to a historical ratio of signal data types, wherein the traffic manager application utilizes one or more configuration updates obtained from the one or more analytic servers to update the stored security configuration for redefining which particular types of signal data to monitor.

5. The non-transitory computer readable medium of claim 4, wherein the executable code when executed by the one or more processors further causes the one or more processors to, when the determining indicates that there is an anomaly in the network traffic based on the application of the anomaly model to the signal data:

generate another anomalous traffic pattern based on the anomaly; and report the another anomalous traffic pattern to a centralized analytic server, wherein the anomalous traffic pattern comprises signal data for two or more signals.

6. The non-transitory computer readable medium of claim 4, wherein the model is generated by a local analytic server of a network security apparatus, the local analytic server is in communication with a centralized analytic server, and the determination of when there is an anomaly in the network traffic is made by a traffic manager of the network security apparatus.

7. A network security apparatus, comprising memory comprising programmed instructions stored thereon and one or more processors configured to execute the stored programmed instructions to:

monitor network traffic between clients and servers for signal data according to a stored security configuration that instructs a traffic management application on which particular types of signal data to identify, the stored security configuration and an associated anomaly model being obtained from one or more analytic servers;

determine when there is an anomaly in the network traffic based on at least one of:

application of the anomaly model to the signal data; or matching of at least a portion of the signal data to an anomalous traffic pattern received from the one or more analytic servers; and initiate a mitigation action when the determining indicates that there is an anomaly in the network traffic based on a current ratio of signal data types in the network traffic to a historical ratio of signal data types, wherein the traffic manager application utilizes one or more configuration updates obtained from the one or more analytic servers to update the stored security configuration for redefining which particular types of signal data to monitor.

8. The network security apparatus of claim 7, wherein the one or more processors are further configured to execute the stored programmed instructions to, when the determining indicates that there is an anomaly in the network traffic based on the application of the anomaly model to the signal data:

generate another anomalous traffic pattern based on the anomaly; and report the another anomalous traffic pattern to a centralized analytic server, wherein the anomalous traffic pattern comprises signal data for two or more signals.

9. The network security apparatus of claim 7, further comprising a traffic manager and a local analytic server, wherein the model is generated by the local analytic server, the local analytic server is in communication with a centralized analytic server, and the determination of when there is an anomaly in the network traffic is made by the traffic manager of the network security apparatus.

10. A network traffic management system, comprising one or more network security apparatuses, client devices, server devices, or analytic server devices, the network traffic management system comprising memory comprising programmed instructions stored thereon and one or more processors configured to execute the stored programmed instructions to:

monitor network traffic between clients and servers for signal data according to a stored security configuration that instructs a traffic management application on which particular types of signal data to identify, the stored security configuration and an associated anomaly model being obtained from one or more analytic servers;

determine when there is an anomaly in the network traffic based on at least one of:

application of the anomaly model to the signal data; or matching of at least a portion of the signal data to an anomalous traffic pattern received from the one or more analytic servers; and initiate a mitigation action when the determining indicates that there is an anomaly in the network traffic based on a current ratio of signal data types in the network traffic to a historical ratio of signal data types, wherein the traffic manager application utilizes one or more configuration updates obtained from the one or more analytic servers to update the stored security configuration for redefining which particular types of signal data to monitor.

11. The network traffic management system of claim 10, wherein the one or more processors are further configured to execute the stored programmed instructions to, when the determining indicates that there is an anomaly in the network traffic based on the application of the anomaly model to the signal data:

generate another anomalous traffic pattern based on the anomaly; and report the another anomalous traffic pattern to a centralized analytic server, wherein the anomalous traffic pattern comprises signal data for two or more signals.

12. The network traffic management system of claim 10, further comprising a traffic manager and a local analytic server, wherein the model is generated by the local analytic server, the local analytic server is in communication with a centralized analytic server, and the determination of when there is an anomaly in the network traffic is made by the traffic manager.

13. The method of claim 1, wherein the traffic manager application comprises the one or more analytic servers.

14. The method of claim 1, wherein the stored security configuration is dynamically updated in real-time, based on learned correlations between signal data and one or more historical network traffic anomalies, and concurrent to one or more of the monitoring the network traffic, determining when there is an anomaly in the network traffic, or initiating the mitigation action.

15. The non-transitory computer readable medium of claim 4, wherein the traffic manager application comprises the one or more analytic servers.

16. The non-transitory computer readable medium of claim 4, wherein the stored security configuration is dynamically updated in real-time, based on learned correlations between signal data and one or more historical network traffic anomalies, and concurrent to one or more of the monitoring the network traffic, determining when there is an anomaly in the network traffic, or initiating the mitigation action.

17. The network security apparatus of claim 7, wherein the traffic manager application comprises the one or more analytic servers.

18. The network security apparatus of claim 7, wherein the stored security configuration is dynamically updated in real-time, based on learned correlations between signal data and one or more historical network traffic anomalies, and concurrent to one or more of the monitoring the network traffic, determining when there is an anomaly in the network traffic, or initiating the mitigation action.

19. The network traffic management system of claim 10, wherein the traffic manager application comprises the one or more analytic servers.

20. The network traffic management system of claim 10, wherein the stored security configuration is dynamically updated in real-time, based on learned correlations between signal data and one or more historical network traffic anomalies, and concurrent to one or more of the monitoring the network traffic, determining when there is an anomaly in the network traffic, or initiating the mitigation action.

* * * * *